(12) United States Patent
Jung

(10) Patent No.: US 10,545,484 B2
(45) Date of Patent: Jan. 28, 2020

(54) APPARATUS AND METHOD FOR CONTROLLING DISTRIBUTED CLOUD FOR THREE-DIMENSIONAL PRINTERS

(71) Applicant: Electronics and Telecommunications Research Institute, Daejeon (KR)

(72) Inventor: Woo Sug Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 48 days.

(21) Appl. No.: 15/673,567

(22) Filed: Aug. 10, 2017

(65) Prior Publication Data
US 2018/0157242 A1    Jun. 7, 2018

(30) Foreign Application Priority Data

Dec. 7, 2016  (KR) .................... 10-2016-0165716

(51) Int. Cl.
*G05B 19/4099*   (2006.01)
*B29C 64/393*   (2017.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
CPC ...... G05B 19/4099; G05B 2219/35134; G05B 2219/49007; B33Y 50/02; B29C 64/393
(Continued)

(56) References Cited

U.S. PATENT DOCUMENTS

2014/0122579 A1* 5/2014 Friefeld ................. H04L 67/06
709/203
2015/0032241 A1   1/2015 Lee et al.
(Continued)

FOREIGN PATENT DOCUMENTS

KR   10-2016-0018096 A   2/2016
KR   10-2016-0024452 A   3/2016
(Continued)

*Primary Examiner* — Thomas C Lee
*Assistant Examiner* — Anzuman Sharmin
(74) *Attorney, Agent, or Firm* — NSIP Law

(57) ABSTRACT

Provided is an apparatus for controlling a distributed cloud for three-dimensional (3D) printers, the apparatus including a user matcher configured to transmit and receive data to/from a user terminal, a 3D model receiver configured to receive a 3D model selected by the user terminal from a 3D model distribution platform server, a 3D printer manager configured to manage a plurality of 3D printers connected to a distributed cloud for 3D printers, a 3D part model generator configured to divide the 3D model into 3D part models, each of which is producible by a single 3D printer, on the basis of property information of the 3D model and specification information of the 3D printers collected by the 3D printer manager, and a 3D part model transmitter configured to transmit the 3D part models to the plurality of 3D printers on the basis of the property information of the 3D model and the specification information of the 3D printers collected by the 3D printer manager.

16 Claims, 8 Drawing Sheets

(51) Int. Cl.
  *B33Y 50/02*   (2015.01)
  *B33Y 50/00*   (2015.01)
  *B29C 64/386*  (2017.01)
  *B33Y 10/00*   (2015.01)
  *G06F 17/50*   (2006.01)
  *G06T 15/00*   (2011.01)

(52) U.S. Cl.
  CPC .............. *G05B 2219/35134* (2013.01); *G05B 2219/49007* (2013.01)

(58) Field of Classification Search
  USPC .......................................................... 700/98
  See application file for complete search history.

(56) References Cited

U.S. PATENT DOCUMENTS

| | | | |
|---|---|---|---|
| 2015/0057784 A1* | 2/2015 | Butler | B29C 67/0088 700/119 |
| 2015/0142153 A1* | 5/2015 | Chun | B29C 64/40 700/98 |
| 2015/0220291 A1 | 8/2015 | Tapley et al. | |
| 2015/0277811 A1 | 10/2015 | Lee et al. | |
| 2015/0321427 A1* | 11/2015 | Gunnarsson | B33Y 50/00 700/98 |
| 2016/0086254 A1 | 3/2016 | Tapley et al. | |
| 2016/0167310 A1* | 6/2016 | Lee | B29C 67/0088 700/98 |
| 2017/0057170 A1* | 3/2017 | Gupta | B29C 67/0088 |

FOREIGN PATENT DOCUMENTS

| | | |
|---|---|---|
| KR | 10-2016-0070477 A | 6/2016 |
| KR | 10-2016-0113716 A | 9/2016 |

* cited by examiner

APPARATUS AND METHOD FOR CONTROLLING DISTRIBUTED CLOUD FOR THREE-DIMENSIONAL PRINTERS

CROSS-REFERENCE TO RELATED APPLICATION

This application claims priority to and the benefit of Korean Patent Application No. 10-2016-0165716, filed on Dec. 7, 2016, the disclosure of which is incorporated herein by reference in its entirety.

BACKGROUND

1. Field of the Invention

The present invention relates to an apparatus and method for controlling a distributed cloud for three-dimensional (3D) printers.

2. Discussion of Related Art

A three-dimensional (3D) printer refers to an apparatus which uses Additive Manufacturing (AM) instead of a conventional machining process to produce a 3D object.

In other words, since the 3D printer is an apparatus which manufactures an object by processing and stacking a material, such as a liquid, a powder polymer, a metal, and the like, in a stacked fashion according to design data, the 3D printer uses AM to stack materials and produce a 3D object.

AM is divided into various techniques including fused deposition modeling (FDM), stereolithography (SLA), digital light processing (DLP), selective laser sintering (SLS), selective laser melting (SLM), and the like according to a stacking method thereof. A material is provided using various types of solid, liquid, and powdered materials, such as a plastic, a metal/porcelain powder, a curable resin, and the like.

A 3D printer uses FDM in the case in which a plastic material is melted and extruded through a nozzle, uses SLA or DLP to cure a resin using a UV laser in the case of a curable liquid resin, and uses SLS or SLM to sinter a powder using a laser in the case of a powdered material.

Meanwhile, a general 3D printer does not support resource sharing and cooperation functions. Therefore, in the case of a conventional technology, a 3D object is produced using a single 3D printer, which leads to various physical limitations, such as in a size of the object, a production speed, a material, and a building technique of the object.

That is, 3D printing methods have different mechanical or chemical procedures such that a single 3D printer supports only a single building technique, and it is impossible to produce an object from a complex material using various types of materials including solids, liquids, powders, and the like.

In addition, since a 3D printer produces an object between a bed and a nozzle by using an additive technique, it is impossible to produce an object having a size exceeding a distance between the bed and the nozzle. In addition, since a 3D printer performs a process of melting and curing a material, tens of hours may be taken depending on a size and precision of a 3D object, so there is limitation with regard to a speed of producing the object.

Accordingly, in order to overcome the physical limitations arising when producing an object using a single 3D printer, there is a need for a technology of producing an object via cooperation of a plurality of 3D printers.

SUMMARY OF THE INVENTION

The present invention is directed to provide an apparatus and method for controlling a distributed cloud for three-dimensional (3D) printers, which is capable of remotely managing resources, jobs, and failures of 3D printers by remotely monitoring remote resources and tasks 3D printers such that the 3D printer resources are shared and by connecting 3D printers via a network to construct a distributed cloud such that the 3D printer resources are shared.

The technical objectives of the inventive concept are not limited to the above disclosure, and other objectives may become apparent to those of ordinary skill in the art based on the following descriptions.

In accordance with the first aspect of the present disclosure, there is provided an apparatus for controlling a distributed cloud for 3D printers, the apparatus including: a user matcher configured to transmit and receive data to/from a user terminal; a 3D model receiver configured to receive a 3D model selected by the user terminal from a 3D model distribution platform server; a 3D printer manager configured to manage a plurality of 3D printers connected to a distributed cloud for—3D printers; a 3D part model generator configured to divide the 3D model into 3D part models, each of which is producible by a single 3D printer, on the basis of property information of the 3D model and specification information of the 3D printers collected by the 3D printer manager; and a 3D part model transmitter configured to transmit the 3D part models to the plurality of 3D printers on the basis of the property information of the 3D model and the specification information of the 3D printers collected by the 3D printer manager.

In accordance with the second aspect of the present disclosure, there is provided a method of controlling a distributed cloud for 3D printers, the method including: receiving a 3D model corresponding to a request that a 3D object be produced from a 3D model distribution platform server; collecting specification information of a plurality of 3D printers connected the distributed cloud for 3D printers; dividing the 3D model into 3D part models each of which is producible by a single 3D printer, on the basis of property information of the 3D model and the specification information of the 3D printer; and assigning jobs of the 3D part models to the plurality of 3D printers. The 3D part model includes connecting structure information of each of the 3D part models, and parts of the 3D object produced by the 3D part model are provided to a user and produced into a 3D object corresponding to the 3D model through an assembly process on the basis of the connecting structure information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
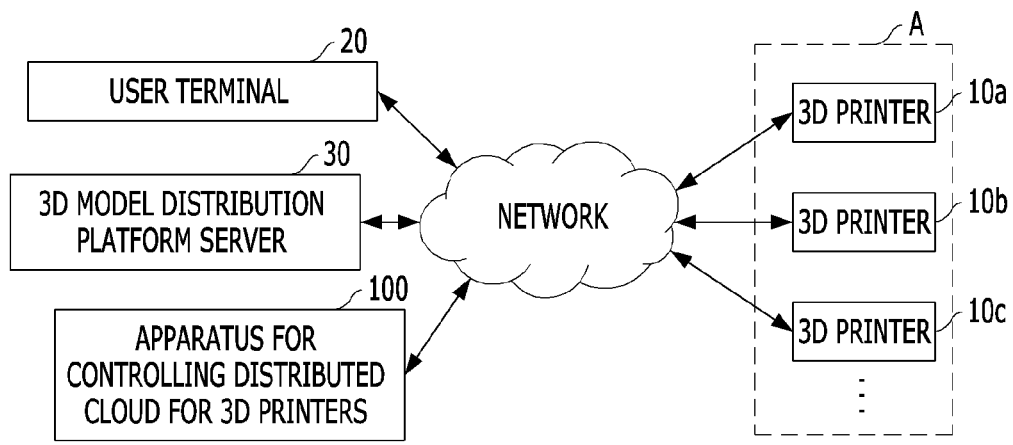
FIG. 1 is a drawing illustrating a system for producing a three-dimensional (3D) object by using a distributed cloud for 3D printers according to an embodiment of the present invention.

Example embodiments of the present invention are disclosed herein. However, specific structural and functional details disclosed herein are merely representative for purposes of describing example embodiments of the present invention, and the example embodiments of the present invention may be embodied in many alternate forms and are not to be construed as limited to the example embodiments of the present invention set forth herein.

Accordingly, while the invention is susceptible to various modifications and alternative forms, specific embodiments thereof are shown by way of example in the drawings and will herein be described in detail. However, it should be understood that there is no intent to limit the invention to the particular forms disclosed, rather the invention is to cover all modifications, equivalents, and alternatives falling within the spirit and scope of the invention.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the present invention. It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe a relationship between elements should be interpreted in a like fashion (i.e., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components, and/or groups thereof and do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

It should also be noted that in some alternative implementations, functions/actions noted in blocks may occur out of the order noted in flowcharts. For example, two blocks shown in succession may in fact be executed substantially concurrently or the blocks may sometimes be executed in a reverse order depending upon the functionality/actions involved.

Hereinafter, an apparatus 100 for controlling a distributed cloud A for three-dimensional (3D) printers according to an embodiment of the present invention (hereinafter, referred to as a control apparatus 100) will be described with reference to FIGS. 1 to 8.

FIG. 1 is a drawing illustrating a system 1 for producing a 3D object by using a distributed cloud for 3D printers according to an embodiment of the present invention.

The system 1 for producing a 3D object according to an embodiment of the present invention includes a plurality of 3D printers 10a, 10b, 10c, . . . (hereinafter, marked with a reference numeral 10), a user terminal 20, a 3D model distribution platform server 30, and a control apparatus 100.

In this case, the each of the components illustrated in FIG. 1 may be connected via a network. The network refers to a connected structure that enables information exchange between nodes, such as terminals and servers. Examples of the network include a 3rd Generation Partnership Project (3GPP) network, a Long Term Evolution (LTE) network, a World Interoperability for Microwave Access (WIMAX) network, the Internet, a Local Area Network (LAN), a Wireless LAN (WLAN), a Wide Area Network (WAN), a Personal Area Network (PAN), a Bluetooth network, a satellite broadcasting network, an analog broadcasting network, a Digital Multimedia Broadcasting (DMB) network, and the like, but the network according to the present invention is not limited thereto.

The user terminal 20 may transmit and receive data to/from the 3D model distribution platform server 30 and the control apparatus 100. That is, the user terminal 20 may support a purchase of a desired 3D model from the 3D model distribution platform server 30 by a user, perform a 3D object simulation in the terminal or an external device depending on a performance of the terminal, and send a request that the object be produced.

In addition, the user terminal 20 may directly receive a simulation result of a 3D object from the control apparatus 100, or upon receiving the simulation result via the 3D model distribution platform server 30, transmit a message approving manufacture of the 3D object corresponding to the received simulation result to the control apparatus 100.

For example, the user terminal 20 may be implemented by a computer that may be accessed via a network. The computer may include a notebook computer, a desktop computer, and a laptop, which have a web browser installed therein.

In addition, the user terminal 20 may include a wireless communication device that secures portability and mobility, that is, all types of handheld wireless communication devices, such as a Personal Communication System (PCS), a Global System for Mobile communications (GSM), Personal Digital Cellular (PDC), a Personal Handy-phone System (PHS), a Personal Digital Assistant (PDA), International Mobile Telecommunication (IMT)-2000, Code Division Multiple Access (CDMA)-2000, W-Code Division Multiple Access (W-CDMA), Wireless Broadband Internet (Wibro) terminal, and the like.

The 3D model distribution platform server 30, upon receiving a 3D model production and purchase request from the user terminal 20, transmits a corresponding 3D model to the control apparatus 100.

The control apparatus 100, upon receiving the 3D model corresponding to the production request from the 3D model distribution platform server 30, generates 3D part models on the basis of specification and property information of remote 3D printers 10 that are distributed in different locations, wherein the specification and property information is previously collected.

When generating the 3D part model, the control apparatus 100 generates connecting structure information for assembling parts of the 3D object produced in the 3D printers 10 into the 3D object desired by the user using the 3D part model.

Meanwhile, since the 3D part model is a part of the 3D object to be assembled into a single 3D object, the 3D part model needs to receive approval for a final resultant shape thereof from a user before assembling the single 3D object.

Accordingly, the control apparatus 100 generates a simulation result for approving the final resultant shape and transmits the simulation result to the user terminal 20 so that a process of confirming whether to approve the 3D object may be performed.

When the user transmits approval to produce the 3D object via the user terminal 20, the control apparatus 100 transmits generated 3D part models to the remote 3D printers 10, and each of the 3D printers 10 produces a part of the 3D object.

In addition, the 3D printers 10 may be concentrated at a specific location, such as a smart factory, or may be installed in a distributed fashion regardless of location.

In addition, the control apparatus 100 according to an embodiment of the present invention may periodically collect information about operation, production, and failure states of the 3D printers 10, and may provide various types of information, such as a production progress of a 3D object, to the user via the user terminal 20.

When the production of the parts of the 3D object is finished in each of the remote 3D printers 10, the corresponding parts of the 3D object are sent to the user and the 3D object is completed through an assembly process.

Hereinafter, the control apparatus 100 according to an embodiment of the present invention will be described in more detail with reference to FIGS. 2 to 8.

Figure 2:
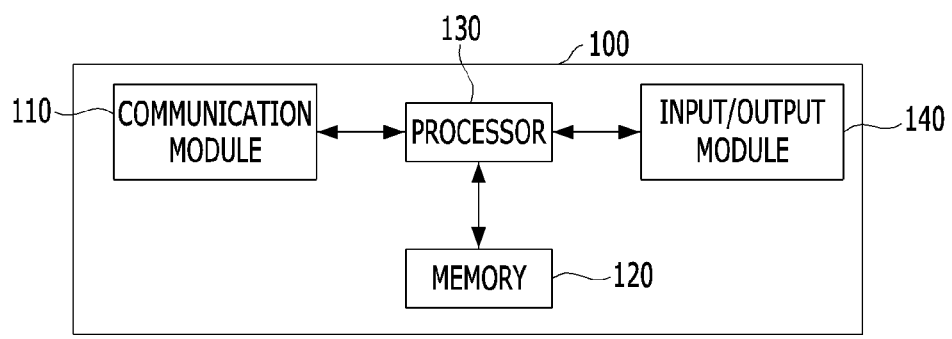
FIG. 2 is a block diagram illustrating a control apparatus according to an embodiment of the present invention.

FIG. 2 is a block diagram illustrating the control apparatus 100 according to an embodiment of the present invention.

The control apparatus 100 according to an embodiment of the present invention includes a communication module 110, a memory 120, a processor 130, and an input/output module 140.

The communication module 110 transmits and receives data to/from the user terminal 20 and the 3D model distribution platform server 30. The communication module 110 may include both a wired communication module and a wireless communication module. The wired communication module may be implemented with a power line communication device, a telephone line communication device, a cable home (MoCA) protocol, an Ethernet protocol, an IEEE1294 protocol, an integrated wired home network, and an RS-485 control device. In addition, the wireless communication module may be implemented with a WLAN, a Bluetooth protocol, a high-data-rate wireless personal area network (HDR WPAN), an ultra-wideband (UWB) protocol, a ZigBee protocol, an impulse radio protocol, a 60 GHz WPAN, a binary-CDMA protocol, wireless Universal Serial Bus (USB) technology, and wireless high-definition multimedia interface (HDMI) technology.

The memory 120 stores a program for generating a 3D part model and controlling the 3D printer 10 to generate a part of a 3D object via the generated 3D part model. In this case, the memory 120 refers to both a nonvolatile storage device, which keeps stored information even when power is not supplied, and a volatile storage device.

For example, the memory 120 may include a NAND flash memory, such as a compact flash (CF) card, a secure digital (SD) card, a memory stick, a solid-state drive (SSD), and a micro SD card; a magnetic computer storage device such as a hard disk drive (HDD); and an optical disk drive, such as a compact disc read only memory (CD-ROM) and a digital versatile disc (DVD)-ROM.

The processor 130 executes the program stored in the memory 120 to generate 3D part models and control the plurality of 3D printers 10 such that a 3D object is produced using the plurality of remote 3D printers 10.

The input/output module 140 provides input/output functions for operating and managing the control apparatus 100.

The control apparatus 100 implemented through the above described construction has functions which will be described with reference to functional blocks shown in FIG. 3.

Figure 3:
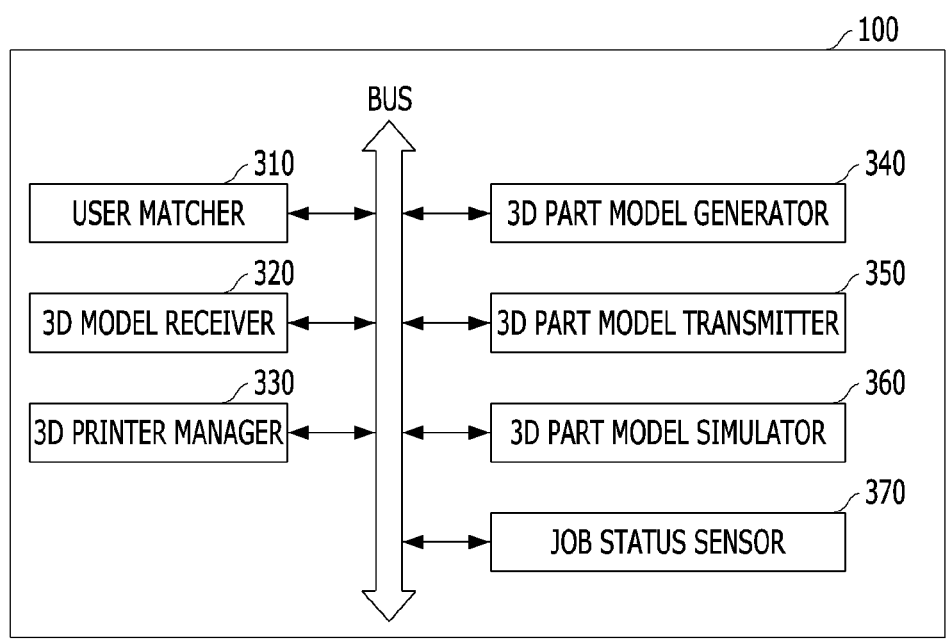
FIG. 3 is a functional block diagram illustrating a control apparatus according to an embodiment of the present invention.

FIG. 3 is a functional block diagram illustrating the control apparatus 100 according to an embodiment of the present invention.

The control apparatus 100 according to an embodiment of the present invention includes a user matcher 310, a 3D model receiver 320, a 3D printer manager 330, a 3D part model generator 340, and a 3D part model transmitter 350.

The user matcher 310 may transmit and receive data to/from the user terminal 20 and exchange information related to producing a 3D object with a user through the transmission and reception.

The 3D model receiver 320 receives a 3D model selected by the user terminal 20 from the 3D model distribution platform server 30.

Here, in an embodiment of the present invention, since a 3D object is produced without a user directly downloading a 3D model, it is possible to protect a copyright of the corresponding 3D model.

The 3D printer manager 330 manages the plurality of 3D printers 10 connected to the distributed cloud A for 3D printers.

The 3D part model generator 340 divides a 3D model into 3D part models, each of which is producible by a single 3D printer 10, on the basis of property information of the 3D model and specification information of the 3D printer 10 collected by the 3D printer manager 330.

A corresponding 3D model is assigned a job ID and is then received by the 3D part model generator 340. The 3D part model generator 340 divides the 3D model into one or more 3D part models on the basis of various types of property information of the 3D model, including a material thereof, a building technique, precision, and the like, and specification information of the remote 3D printers 10 collected by the 3D printer manager 330. Each of the divided 3D part models is assigned an ID, In addition, the 3D part model generator 340 may automatically include connecting structure information, which is used to produce a 3D object by connecting parts of the 3D object produced through the 3D part models, in the 3D part model.

The 3D part model transmitter 350 transmits the 3D part models to the plurality of 3D printers 10 on the basis of the property information of the 3D model and the specification information of the 3D printers 10 collected by the 3D printer manager 330.

Hereinafter, detailed operations of the components included in FIG. 3 will be described with references to FIGS. 4 to 6.

Figure 4:
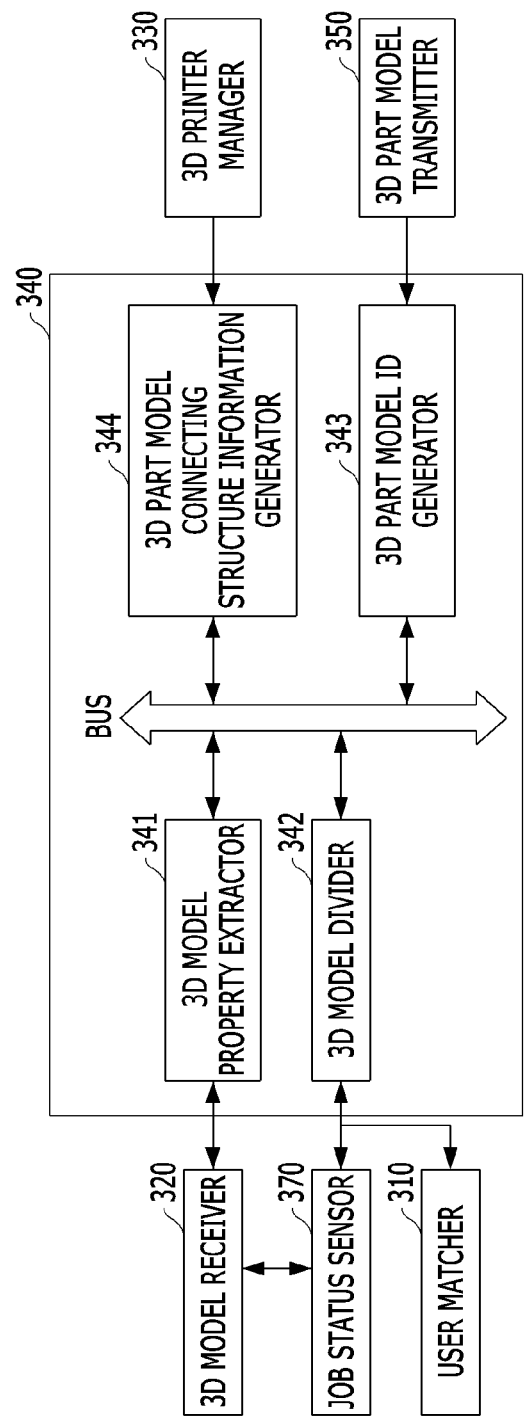
FIG. 4 is a block diagram illustrating a 3D part model generator.

FIG. 4 is a block diagram illustrating the 3D part model generator 340.

The 3D part model generator 340 according to an embodiment of the present invention includes a 3D model property extractor 341, a 3D model divider 342, a 3D part model ID generator 343, and a 3D part model connecting structure information generator 344.

The 3D model property extractor 341 receives a 3D model, which is a design data of a 3D object that is requested by the user terminal 20, and extracts property information of the 3D model. Here, the 3D model receiver 320 assigns a job ID to the 3D model and transmits the 3D model, which is assigned the job ID, to the 3D model property extractor 341, and the assigned job ID is transmitted to the 3D part model ID generator 343, which will be described later.

The 3D model divider 342 primarily divides the 3D model on the basis of the property information of the 3D model. In addition, the 3D model divider 342 may generate 3D part models by dividing the 3D model on the basis of connecting structure information for assembling the 3D part models.

The 3D model divider 342 may generate a 3D part model corresponding to a certain 3D printer 10 which is the most suitable for the property information of the 3D model in consideration of the specification information of the 3D printer 10. In this way, when a 3D model desired by a user does not match the specification of the 3D printer 10 which is actually available for production, the user may produce an object having the closest form to a desired form by checking a simulation result of the 3D object.

To this end, the 3D model divider 342 may receive ID information of the 3D printer 10 from the 3D printer manager 330 and include the received ID information of the 3D printer 10 in the 3D part model. The ID information of the 3D printer 10 may be used to transmit a 3D part model to the remote 3D printer 10 which will produce a 3D object from the corresponding 3D part model.

The 3D part model ID generator 343 assigns a 3D part model ID to the job ID of the 3D model assigned by the 3D model receiver 320. In this case, the 3D part model ID generator 343 may assign 3D part model IDs corresponding in number to the number of divided 3D part models to the job ID The 3D part model connecting structure information generator 344 generates connecting structure information for connecting the 3D part models that are divided and generated by the 3D model divider 342.

In this case, a connecting structure includes a male type structure and a female type structure. Each of the male type structure and the female type structure may have an ID value. The IDs of the male type structure and the female type structure are transmitted to the 3D model divider 342 along with male type/female type structure information.

Accordingly, as described above, the 3D model divider 342 may generate 3D part models divided from a 3D model on the basis of the connecting structure information. ID information used herein may include information about a job ID for the 3D model, IDs of n 3D part models, and IDs of n 3D printers 10.

The 3D part models generated as such are transmitted to a 3D part model simulator 360, which will be described later, so that a simulation result of the 3D model is generated. Hereinafter, the 3D part model simulator 360 will be described with reference to FIG. 5.

Figure 5:
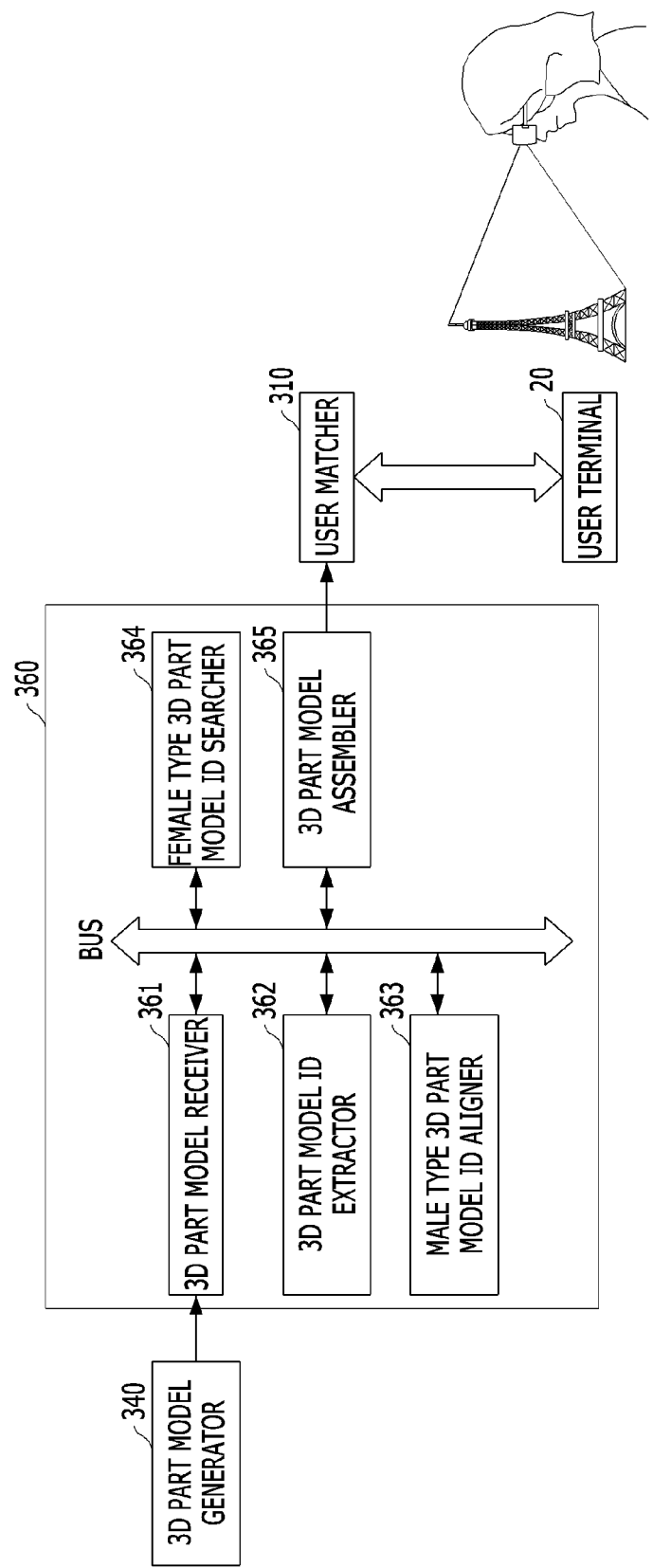
FIG. 5 is a block diagram illustrating a 3D part model simulator.

FIG. 5 is a block diagram illustrating the 3D part model simulator 360.

The control apparatus 100 according to an embodiment of the present invention may further include the 3D part model simulator 360 configured to generate a simulation result of a 3D model assembled from divided 3D part models. In this case, the simulation result is provided to the user terminal 20 through the user matcher 310, and upon receiving approval of the simulation result from the user terminal 20, the 3D part model generator 340 transmits the one or more generated 3D part models to the 3D printers 10 through the 3D part model transmitter 350.

The 3D part model simulator 360 includes a 3D part model receiver 361, a 3D part model ID extractor 362, a male type 3D part model ID aligner 363, a female type 3D part model ID searcher 364, and a 3D part model assembler 365.

The 3D part model receiver 361 receives a 3D part model from the 3D part model generator 340.

The 3D part model ID extractor 362 extracts a 3D part model ID including IDs of male type/female type 3D part models included in the 3D part model. The extracted pieces of ID information of the male type 3D part model and female type 3D part model are transmitted to the male type 3D part model ID aligner 363 and the female type 3D part model ID searcher 364, respectively.

The male type 3D part model ID aligner 363 and the female type 3D part model ID searcher 364 use the 3D part models as information for constructing a single 3D model.

The male type 3D part model ID aligner 363 sequentially aligns IDs of male type 3D part models. The female type 3D part model ID searcher 364 searches for IDs of female type 3D part models corresponding the IDs of the male type 3D part models, and generates pieces of connecting information corresponding to each of the found female type 3D part model IDs.

The 3D part model assembler 365 generates a simulation result by assembling the 3D part models on the basis of the pieces of connecting information and provides the generated simulation result to the user terminal 20 through the user matcher 310. A user receiving the simulation result may determine whether to approve a 3D object by checking the 3D model via enlargement, reduction, rotation, and the like using the user terminal 20.

The user terminal for checking the simulation result of the 3D object may include a Head Mounted Display (HMD), which is a key device of an augmented reality service.

Meanwhile, the control apparatus 100 according to an embodiment of the present invention may sense an operation or failure state of the 3D printer 10 through a job status sensor 370. Hereinafter, the sensing of the operation or failure state of the 3D printer 10 will be described with reference to FIG. 6.

Figure 6:
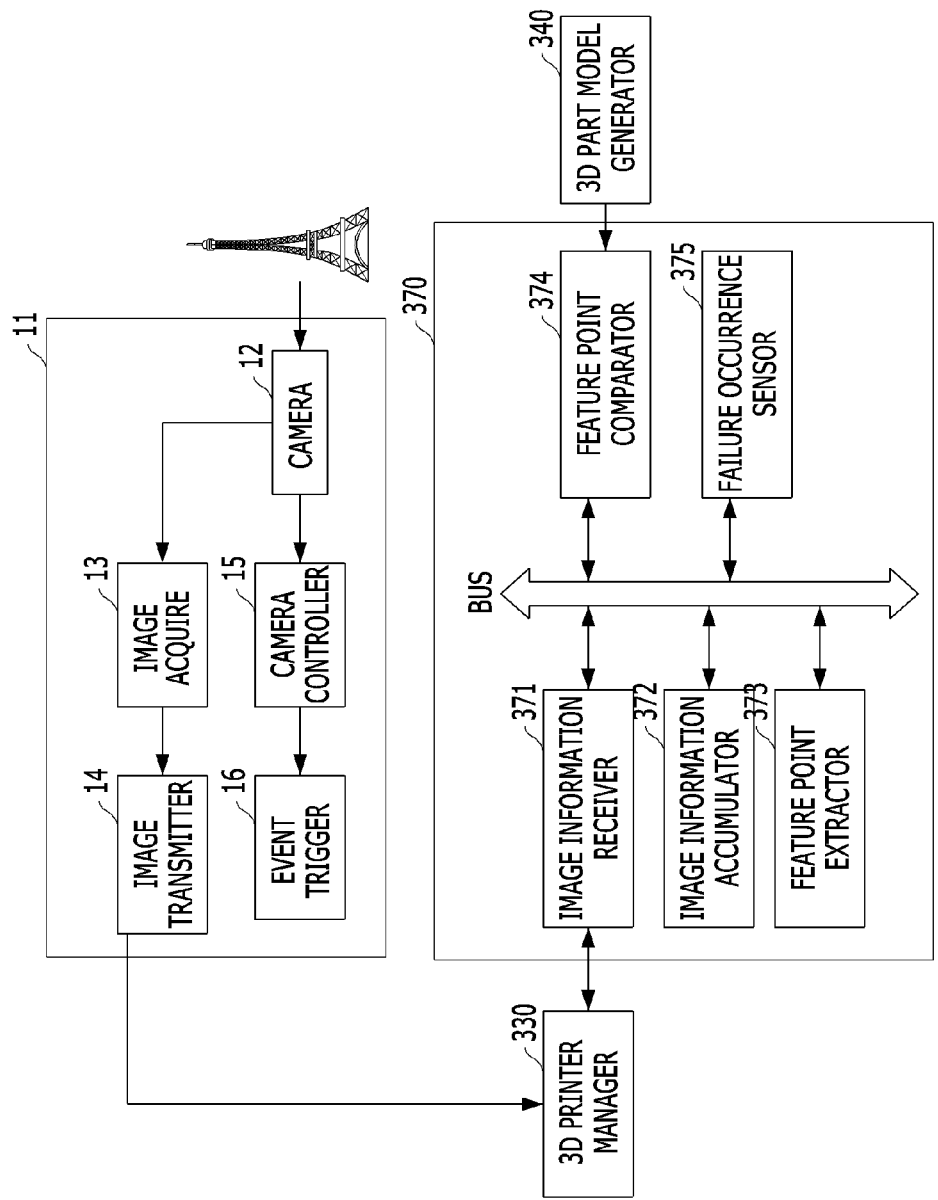
FIG. 6 is a block diagram illustrating a job status sensor.

FIG. 6 is a block diagram illustrating the job status sensor 370.

The control apparatus 100 according to an embodiment of the present invention may further include the job status sensor 370 configured to sense a job status and a failure of the plurality of 3D printers 10.

According to an embodiment of the present invention, the 3D printer 10 may be provided with a 3D object production failure sensor 11 to sense a failure that occurs in the process of producing a part of a 3D object by using a 3D part model, and the control apparatus 100 may be provided with the job status sensor 370.

According to an embodiment of the present invention, in order to effectively sense a failure occurring in the process of producing a part of a 3D object, a feature extracting technique may be used.

A method of sensing a failure using the feature point extracting technique includes extracting a feature point in a pattern having intersecting lines or a complicated pattern from image information, comparing the extracted feature point with a feature point of a 3D model, and determining that a failure occurs when a mismatch of the feature points exceeds a predetermined range.

Generally, processors used in the remote 3D printers 10 have very low performance and lack of hardware resources, such as memory, and thus have difficulty in extracting normal feature point. According to an embodiment of the present invention, the remote 3D printer 10 collects and reports only image information for extracting feature points, and the control apparatus 100 may perform feature point extraction and failure detection.

Meanwhile, the 3D printer 10 may be provided with the 3D object production failure sensor 11. The 3D object production failure sensor 11 may include a camera 12, an image acquirer 13, an image transmitter 14, a camera controller 15, and an event trigger 16.

The image acquirer 13 collects image information about a process of producing a part of a 3D object from one or more cameras 12 installed in the 3D printer 10, and the image transmitter 14 receives the image information from the image acquirer 13 and transmits the received image information to the job status sensor 370 in real time via the 3D printer manager 330.

Meanwhile, depending on building techniques used in the 3D printer, both a case in which the form of the 3D object produced up to the present may be seen and a case in which the form of the 3D object produced up to the present may not be seen when using a material, such as a powder, exist.

Accordingly, in order to collect image information from the 3D printer 10 using the building technique in which the 3D object may be seen, the event trigger 16 may periodically transmit an image information acquisition signal to the camera controller 15.

In addition, in order to collect the image information from the 3D printer 10 using the building technique in which the 3D object may not be seen, the event trigger 16 may transmit the image information acquisition signal to the camera controller 15 when a single layer of the 3D object is completed by the 3D printer 10.

The camera controller 15 serves to control the camera 12 to obtain an image of a 3D object being produced.

The job status sensor 370 operating in conjunction with the 3D object production failure sensor 11 of the 3D printer may include an image information receiver 371, an image information accumulator 372, a feature point extractor 373, a feature point comparator 374, and a failure occurrence sensor 375.

The image information receiver 371 receives pieces of image information corresponding to job statuses of parts of a 3D object from the plurality of 3D printers 10. The image information accumulator 372 accumulates the received pieces of image information to synthesize images of the parts of the 3D object that are being produced by the plurality of 3D printers 10.

The feature point extractor 373 extracts a feature point from the image synthesized by the image information accumulator 372, and the feature point comparator 374 compares the extracted feature point to a feature point of a 3D part model.

The failure occurrence sensor 375 senses that a failure occurs when a mismatch of the feature points is determined to exceed a predetermined range as a result of the comparison.

In addition, the feature point comparator 374 may compare a previously extracted feature point to a currently extracted feature point. In this case, the feature point comparator 374 may sense that a failure occurs when the previously extracted feature point is identical to the currently extracted feature point.

When a failure occurrence is sensed through the above described method, the failure occurrence sensor 375 notifies the 3D printer manager 330 of the failure occurrence.

Meanwhile, the job status sensor 370 may provide a user with an image of a part of the 3D object that is currently being produced, and may provide the user with a progress of the part of the 3D object produced so far by comparing the part of the 3D object currently being produced with the 3D part model. In addition, when progress information of the part of the 3D object production is transmitted to the 3D part model simulator 360, the 3D part model simulator 360 may simulate the progress information of the entire 3D object production and provide the user with a result of the simulation.

Hereinafter, a database D in which property information and a job status of the 3D printer 10 are stored will be described with reference to FIG. 7.

Figure 7:
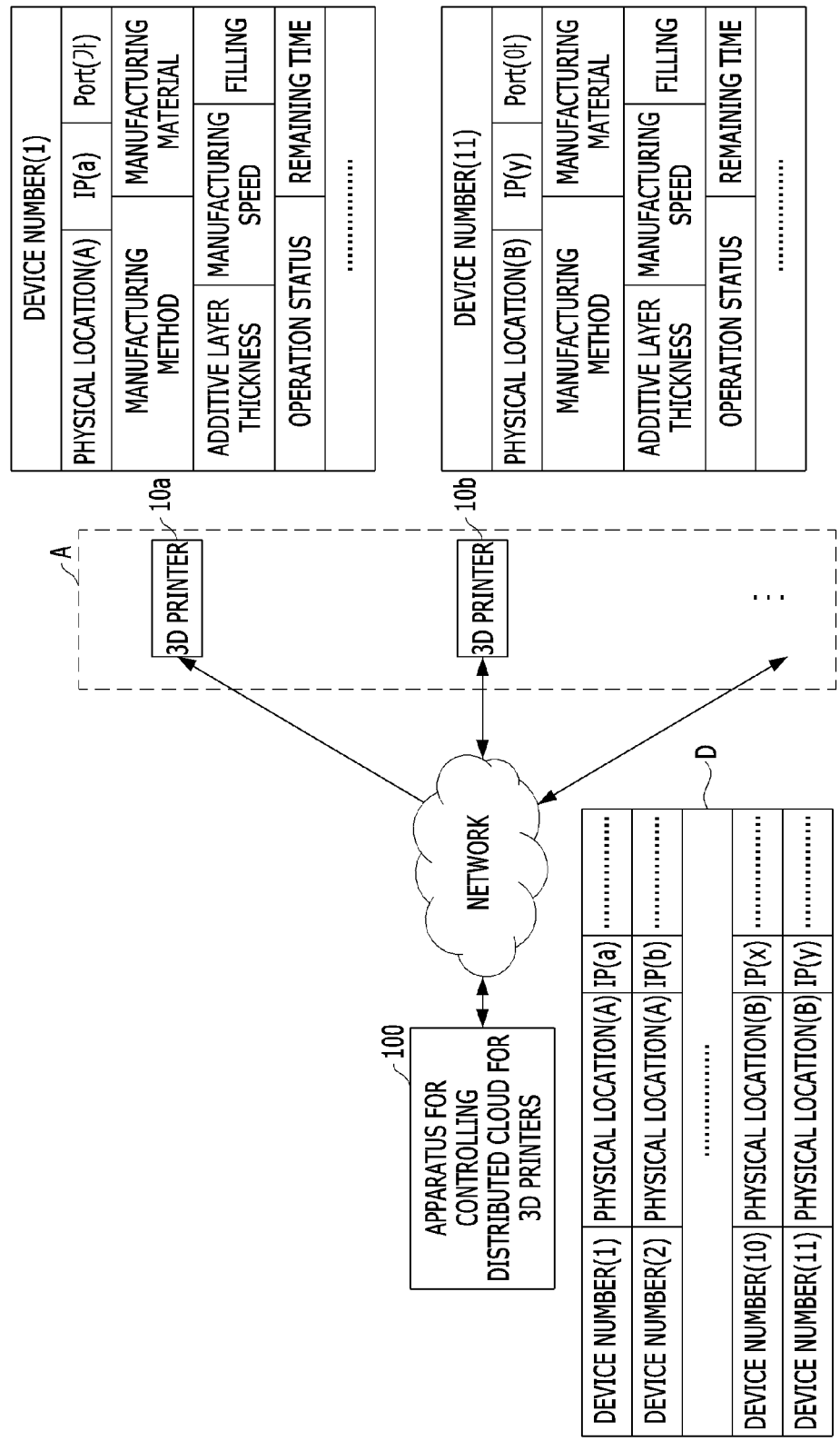
FIG. 7 is a diagram illustrating property information and a job status of a 3D printer.

FIG. 7 is a diagram illustrating property information and a job status of the 3D printer 10.

The 3D printer manager 330 included in the control apparatus 100 according to an embodiment of the present invention may include the database D for managing the plurality of 3D printers 10. The 3D printer manager 330 may manage the plurality of 3D printers 10 by automatically collecting specification information and job statuses of the 3D printers 10 located in the distributed cloud A and storing the collected specification information and job statuses in the database D.

Based on such information, the 3D printer manager 330 may automatically select the 3D printer 10 which is the most suitable for a production condition of a 3D object desired by a user and automatically assign a relevant 3D part model to the 3D printer 10.

In detail, the 3D printer manager 330 may periodically or non-periodically receive specification information and job statuses, including a device number, a physical location, an IP number, a port number, a manufacturing method, a manufacturing material, a manufacturing speed, an additive layer thickness, a filling, an operation status, a remaining time, and the like, from the 3D printers 10. The pieces of specification information and the job statuses are stored and managed in the database D.

Meanwhile, the 3D printers 10 may transmit the specification information and the job status information of the 3D printers 10 to the 3D printer manager 330 in an initial booting process.

When the 3D printers 10 are newly added, the specification information and job status information are updated in the database D on the basis of physical location information.

Accordingly, the specification information and job status information of the 3D printers are managed based on the physical location information. In this case, the physical location information refers to a physical location at which the 3D printer 10 is actually installed, and, for example, refers to division information such as si (do), gu (gun), dong (myeon, ri) in the case of a Korea, or may vary depending on administrative district information of a relevant country in the case of another country.

Since the specification information and job status information of the 3D printer 10 are managed on the basis of actual physical information, the 3D printer 10 which is the closest to a location of a user who requests that a 3D object be produced is selected and a job is performed, thereby minimizing a time and effort required for the user to receive a corresponding 3D object.

In addition, according to an embodiment of the present invention, the 3D printer 10 which will produce a part of the 3D object may be selected in consideration of a physical location thereof as well as in consideration of various types of specification information of the 3D printer 10, such as an operation status, an available time considering a remaining time to complete the part of the 3D object, a manufacturing method, a manufacturing material, an additive layer thickness, a manufacturing speed, a filling, and the like, so that the 3D printer 10 the most suitable for the user is selected.

In addition, the job status information may include whether the 3D printer 10 uses resources as well as information related to a failure sensed by the job status sensor 370. Accordingly, when a certain 3D printer 10 is in the failure state, the 3D printer 10 is excluded from being selected until a failure recovery is completed. When the failure recovery is completed, information related to the failure recovery of the 3D printer 10 is updated in the database D and is reflected on a later process of selecting the 3D printer 10.

Hereinafter, a 3D part model payload according to an embodiment of the present invention will be described with reference to FIG. 8.

Figure 8:
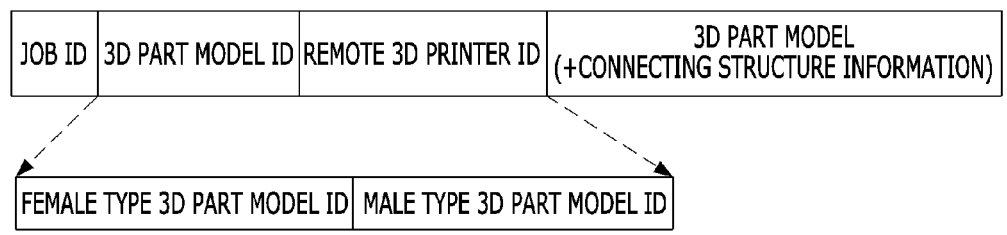
FIG. 8 is a diagram illustrating a 3D part model payload.

FIG. 8 is a diagram illustrating a 3D part model payload.

A 3D part model transmitted by the control apparatus 100 according to an embodiment of the present invention may be transmitted to the 3D printer 10 as a 3D part model payload in the form of a network packet as shown in FIG. 8. In this case, since a header of the network packet conforms to a conventional IP packet header, the header is not additionally illustrated in FIG. 8.

The 3D part model payload may include a job ID, a 3D part model ID, a 3D printer ID, and connecting structure information which are included in a 3D part model.

The job ID is ID information of a 3D model corresponding to a request made by a user to produce a 3D object.

The 3D part model ID includes a male type 3D part model ID and a female type 3D part model ID, and is used to assemble 3D part models.

The 3D printer ID includes information related to the 3D printer 10 which is located in the distributed cloud A for 3D printers in order to produce a part of the 3D object using the 3D part model and.

The 3D part model refers to a digital design data for producing the part of the 3D object via the 3D printer 10, and the 3D part model includes the connecting structure information for connecting the 3D part models. When transmitted via a network, the 3D part models may be divided into n or more in number and transmitted.

The elements illustrated in FIGS. 1 to 7 according to an embodiment of the present invention may be implemented in the form of software or hardware, such as a Field Programmable Gate Array (FPGA) or an Application Specific Integrated Circuit (ASIC), and may perform predetermined functions.

However, the "elements" are not limited to meaning software or hardware. Each of the elements may be configured to be stored in a storage medium capable of being addressed and configured to execute by one or more processors.

For example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and functions provided in the corresponding elements may be combined into fewer elements or may be further divided into additional elements.

Hereinafter, a control method performed by the control apparatus 100 of the distributed cloud for 3D printers according to an embodiment of the present invention will be described with reference to FIG. 9.

Figure 9:
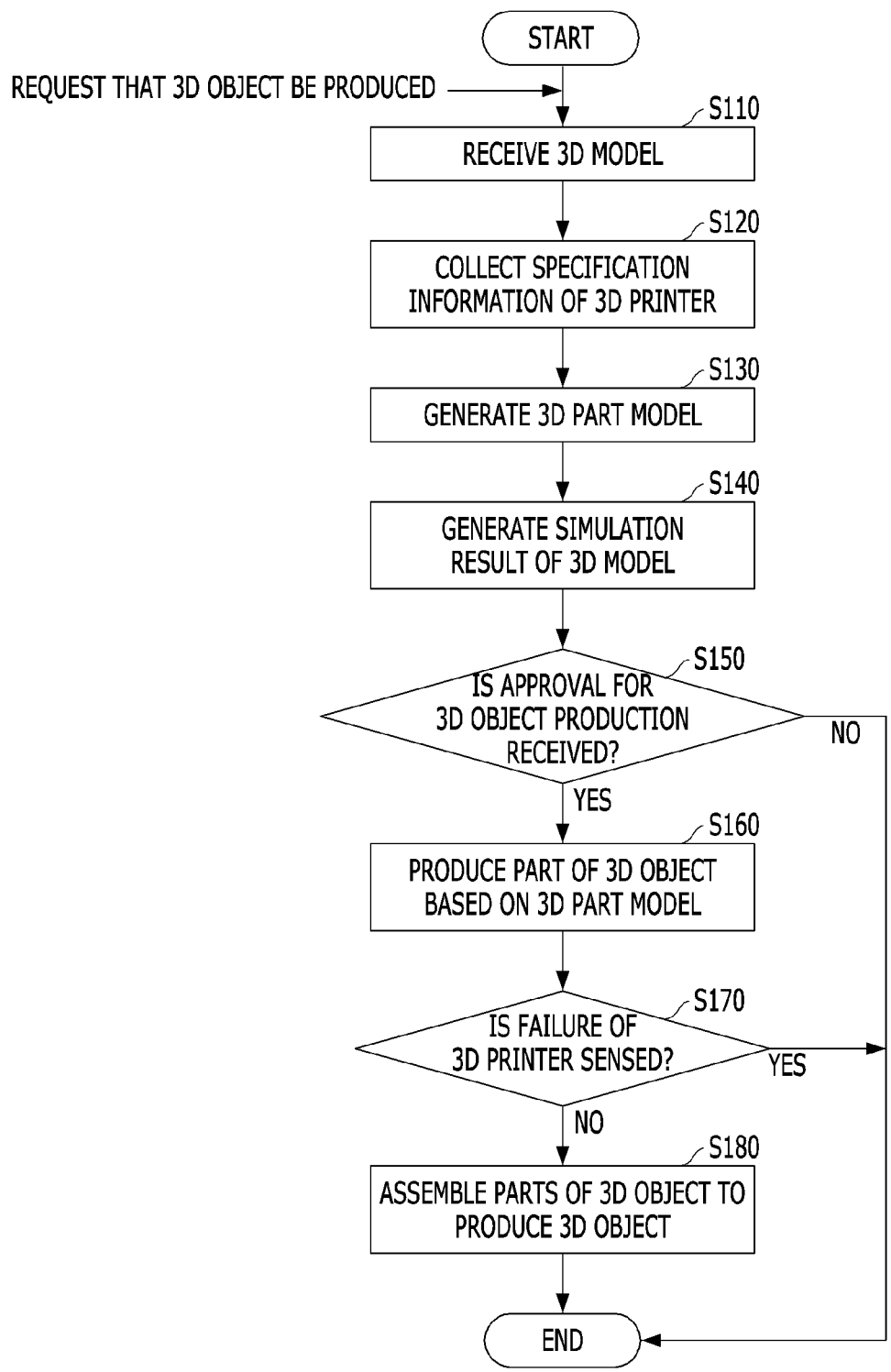
FIG. 9 is a flowchart showing a method of controlling a distributed cloud for 3D printers according to an embodiment of the present invention.

FIG. 9 is a flowchart of a method of controlling a distributed cloud for 3D printers according to an embodiment of the present invention.

A control method according to an embodiment of the present invention includes receiving, when a user sends the 3D model distribution platform server 30 a request that a 3D object be produced via the user terminal 20, a 3D model corresponding to the user's request that the 3D object be produced from the 3D model distribution platform server 30 (S110).

Then, pieces of specification information of the plurality of 3D printers 10 connected the distributed cloud for 3D printers are collected (S120), and the 3D model is divided into 3D part models which are each producible by a single 3D printer 10 based on property information of the 3D model and the specification information of the 3D printers 10 (S130).

The 3D model is assigned a job ID, and the job ID is assigned 3D part model IDs that correspond to the divided 3D part models and is managed.

In addition, the 3D part model includes connecting structure information corresponding to each of the 3D part models. Accordingly, a part of the 3D object produced through the 3D part model is provided to the user and is assembled on the basis of the connecting structure information to be produced into a 3D object corresponding to the 3D model.

Then, a simulation result of the 3D model assembled from the divided 3D part models is generated and is transmitted to the user terminal 20 (S140). Then, upon receiving approval of the simulation result from the user terminal 20 (S150), jobs of the 3D part models are assigned to the plurality of 3D printers 10 (S160).

The control method according to an embodiment of the present invention may further include sensing a job status and a failure of the 3D printer 10 (S170). After production of parts of the 3D object is completed without failure, the parts of the 3D object are assembled to complete production of the 3D object (S180).

In order to sense a failure, according to an embodiment of the present invention, pieces of image information related to job statuses of the parts of the 3D object are received from the 3D printers 10, and the received pieces of image information are accumulated to synthesize images of the parts of the 3D object that are being produced in the plurality of printers 10.

A feature point is extracted from the synthesized image, and the extracted feature point is compared to a feature point of the 3D part model, and it is determined that a failure occurs when a mismatch of the feature points exceeds a predetermined range.

According to an embodiment of the present invention, a failure occurrence may be sensed when a previously extracted feature point is identical to a currently extracted feature point.

Meanwhile, the above-described operations S110 to S180 may be further divided into additional operations or may be combined into fewer operations. In addition, some of the operations may be omitted if necessary or executed in a reverse order. Descriptions that were omitted but were described above in FIGS. 1 and 8 may be applied to the control method shown in FIG. 9.

According to an embodiment of the present invention, a 3D object can be easily produced without being restricted by various physical limitations occurring during production of the 3D object on the basis of a conventional single printer, such as a producing speed, a material, a building technique, and a size of the 3D object.

Accordingly, a user can easily and rapidly produce a 3D object of various sizes using a complex material in a desired form.

Meanwhile, the control method according to the embodiment of the present invention may be implemented in the form of a recording medium that contains a computer program stored in a medium executed by a computer or a recording medium that contains instructions executable by the computer. The computer-readable media may be any available media that can be accessed by computers, and include all of volatile and nonvolatile media and removable and non-removable media. The computer-readable media may include all of computer storage media and communication media. The computer storage media include all of volatile, nonvolatile, removable, and non-removable media which are implemented using any method or technology for information storage, such as computer readable instructions, data structures, program modules, or other data. Typically, the communication media include computer readable instructions, data structures, program modules, other data of modulated data signals such as carrier waves, or other transmission mechanisms, and include any information transfer media.

Although the method and system of the present invention have been described in connection with specific embodiments of the present invention, some or all of the components or operations thereof may be realized using a computer system that has general-use hardware architecture.

According to an embodiment of the present invention, a 3D object can be easily produced without being restricted by various physical limitations occurring during production of the 3D object on the basis of a conventional single printer, such as a producing speed, a material, a building technique, and a size of the 3D object.

Accordingly, a user can easily and rapidly produce a 3D object of various sizes using a complex material in a desired form.

The above description of the present invention is for illustrative purposes, and a person having ordinary skilled in the art should appreciate that other specific modifications can be easily made without departing from the technical spirit or essential features of the invention. Therefore, the above embodiments should be regarded as illustrative rather than limitative in all aspects. For example, components which have been described as being a single unit can be embodied in a distributed form, whereas components which have been described as being distributed can be embodied in a combined form.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. An apparatus for controlling a distributed cloud for three-dimensional (3D) printers, the apparatus comprising:
   a 3D model receiver configured to receive a 3D model selected by a terminal from a 3D model distribution platform server;
   a 3D printer manager configured to manage a plurality of 3D printers connected to the distributed cloud for 3D printers;
   a 3D part model generator configured to divide the 3D model into 3D part models, each of which is producible by a single 3D printer, based on property information of the 3D model and specification information of the 3D printers collected by the 3D printer manager;
   a job status sensor configured to sense job statuses and failures of the plurality of 3D printers; and
   a 3D part model transmitter configured to transmit the 3D part models to the plurality of 3D printers based on the collected property information and the collected specification information,
   wherein the 3D part model generator comprises a 3D model divider configured to generate the 3D part model by dividing the 3D model based on the property information of the 3D model and the specification information of the 3D printers so that the 3D part model corresponds to a 3D printer which is determined to be most suitable for the extracted property information of the 3D model in consideration of the specification information of the 3D printers, and wherein the 3D model divider receives ID information of the 3D printer and adds the received ID information of the 3D printer to the 3D part model, and
   wherein the job status sensor comprises:
   an image information receiver configured to receive pieces of image information corresponding to job statuses of parts of the 3D object from the plurality of 3D printers;
   an image information accumulator configured to accumulate the pieces of image information and synthesize images of the parts of the 3D object that are being produced by the plurality of 3D printers;
   a feature point extractor configured to extract a feature point from the synthesized image;
   a feature point comparator configured to compare the extracted feature point to a feature point of the 3D part model; and
   a failure occurrence sensor configured to sense that a failure occurs in response to determining that a mismatch of the extracted feature points exceeds a predetermined range based on a result of the comparison.

2. The apparatus of claim 1, wherein the 3D part model generator automatically includes connecting structure information, which is used to produce a 3D object by connecting parts of the 3D object produced through the 3D part models, in the 3D part model.

3. The apparatus of claim 2, wherein the 3D part model generator further comprises:
a 3D model property extractor configured to extract the property information of the 3D model;
a 3D part model identification (ID) generator configured to assign a 3D part model ID to a job ID of the 3D model, which is assigned by the 3D model receiver; and
a 3D part model connecting structure information generator configured to generate the connecting structure information for connecting the 3D part models,
wherein the 3D model divider generates the 3D part model on the basis of the connecting structure information.

4. The apparatus of claim 3, wherein the 3D part model ID generator assigns 3D part model IDs corresponding in number to a number of the divided 3D part models to the job ID.

5. The apparatus of claim 1, further comprising a 3D part model simulator configured to generate a simulation result of a 3D model assembled from the divided 3D part models,
wherein the simulation result is provided to the terminal through a user matcher, and upon receiving approval of the simulation result from the terminal, the 3D part model generator transmits the 3D part model to the 3D part model transmitter.

6. The apparatus of claim 5, wherein the 3D part model simulator comprises:
a 3D part model receiver configured to receive the 3D part model from the 3D part model generator;
a 3D part model ID extractor configured to extract a 3D part model ID including IDs of male type and female type 3D part models included in the 3D part model;
a male type 3D part model ID aligner configured to sequentially align the IDs of the male type 3D part models;
a female type 3D part model ID searcher configured to search to find IDs of the female type 3D part models corresponding to the aligned IDs of the male type 3D part models, and generate pieces of connecting information corresponding to each of the found IDs of the female type 3D part models; and
a 3D part model assembler configured to generate the simulation result by assembling the 3D part models based on the pieces of the connecting information and provide the user terminal with the simulation result via the user matcher.

7. The apparatus of claim 1, wherein the feature point comparator is further configured to compare a previously extracted feature point to a currently extracted feature point.

8. The apparatus of claim 1, wherein the 3D printer manager comprises a database for managing the plurality of 3D printers, and the database stores a job status and the specification information of the 3D printer.

9. The apparatus of claim 1, wherein the 3D part model is transmitted to the 3D printer via a 3D part model payload in the form of a network packet.

10. The apparatus of claim 9, wherein the 3D part model payload includes a job ID, a 3D part model ID, a 3D printer ID, and connecting structure information, which are included in the 3D part model.

11. A method of controlling a distributed cloud for three-dimensional (3D) printers, the method comprising:
receiving a 3D model corresponding to a request that a 3D object be produced of a user from a 3D model distribution platform server;
collecting specification information of a plurality of 3D printers connected to the distributed cloud for 3D printers;
dividing the 3D model into 3D part models, each of which is producible by a single 3D printer, based on property information of the 3D model and the specification information of the 3D printers so that the 3D part model corresponds to a 3D printer which is determined to be most suitable for the extracted property information of the 3D model in consideration of the specification information of the 3D printers;
sensing job statuses and failures of the plurality of 3D printers; and
assigning jobs of the 3D part models to the plurality of 3D printers;
wherein each of the 3D part models includes connecting structure information of the 3D part models,
wherein parts of the 3D object are produced by the plurality of 3D printers as a 3D object corresponding to the 3D model through an assembly process based on the connecting structure information to produce the 3D object via cooperation of the plurality of 3D printers,
wherein the dividing the 3D model into the 3D part models includes receiving ID information of the 3D printer and adding the received ID information of the 3D printer to the 3D part model, and
wherein the sensing of the job statuses and failures of the plurality of 3D printer comprises:
receiving pieces of image information corresponding to job statuses of the parts of the 3D object from the plurality of 3D printers;
accumulating the pieces of image information and synthesizing images of the parts of the 3D object that are being produced by the plurality of 3D printers;
extracting a feature point from the synthesized image;
comparing the extracted feature point to a feature point of the 3D part model; and
sensing that a failure occurs in response to determining that a mismatch of the feature points exceeds a predetermined range based on a result of the comparison.

12. The method of claim 11, further comprising:
generating a simulation result of a 3D model assembled from the divided 3D part models; and
receiving an approval of the simulation result from a user,
wherein in response to the approval of the simulation result being received, the 3D part models are assigned to the plurality of 3D printers.

13. The method of claim 11, wherein a job ID is assigned to the 3D model, and the divided 3D part model ID is assigned to the job ID.

14. The method of claim 11, wherein the sensing that a failure occurs includes comparing a previously extracted feature point to a currently extracted feature point.

15. The apparatus of claim 1, wherein the property information includes any one or any combination of any two or more of a material of the 3D model, a building technique for the 3D model, and a precision specification of the 3D model.

16. The apparatus of claim 1, wherein the specification information includes any one or any combination of any two or more of an operation status of the 3D printers, a remaining rendering time of the 3D printers, a manufacturing method by the 3D printers, a manufacturing material used by the 3D printers, an additive layer thickness specification of the 3D printers, a manufacturing speed of the 3D printers, and a filling of the 3D printers.

* * * * *